United States Patent Office 3,715,304
Patented Feb. 6, 1973

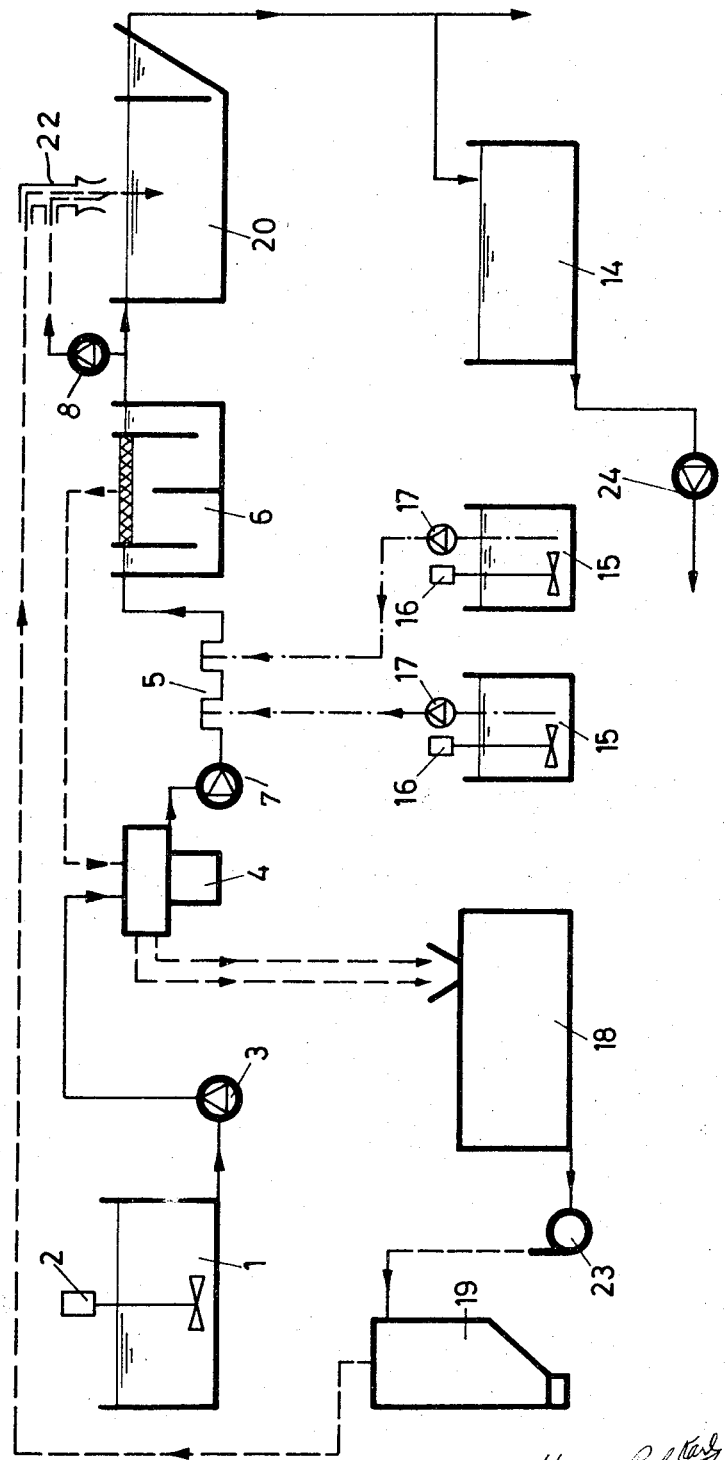

3,715,304
METHOD OF CONTROLLING THE TEMPERATURE IN A SEWAGE TREATMENT SYSTEM, AND APPARATUS THEREFOR
Hans-Peter Karl Hefermehl, 1803 Chardonne, Chalet des Roches, Switzerland
Filed Jan. 11, 1971, Ser. No. 105,476
Claims priority, application Switzerland, Jan. 13, 1970, 367/70
Int. Cl. C02c 1/02
U.S. Cl. 210—3
10 Claims

ABSTRACT OF THE DISCLOSURE

Method and apparatus for controlling the temperature in a biological breakdown system, such as sewage treatment, wherein hot gas and/or steam is added to the system to maintain the proper temperature.

---

The present invention concerns a method of controlling the temperature in a biological breakdown system, in particular in a sewage treatment system, and apparatus for the application of the said method.

As is known, the breakdown of organic substances by bacterial cultures in biological breakdown systems, as in the biological section of sewage treatment systems, is adversely affected when the temperature in the ventilation and purifying tanks falls below a limit of 10° C., for instance. This falling of the temperature occurs in particular under the influence of a low outside temperature.

Sewage biology is chiefly concerned with the action of species of Clostridium and *Bact. coli*. When their biological metabolic activity in suitable culture media is compared, it is found that below +10° C. only an extremely scanty growth occurs within eight to twelve days, and that at about 0° C. such growth fails altogether. At +20° C., a very strong growth is achieved within eight days, and at +37° C. the same growth is already reached within two to three hours. This means that the rise in temperature from +20 to +37° C. increases the biological metabolic activity about a hundredfold. A rise in temperautre from +10° C. to +37° C. results in an even more striking growth trend. Of course, temperature control in sewage biology is not limited to +37° C.; there are cultures which develop a high metabolic activity at temperatures up to +50° C.

The breakdown systems built so far are all of the high throughput type. They are mainly municipal or industrial systems. In systems of that size, temperature control in the biological section does not raise the problems that present themselves in smaller breakdown systems. In large systems with their considerably greater quantities of sewage, the heat developed by the biological metabolic activity is sufficient to prevent the temperature in the biological section of the system from falling below about +20° C. The case is different in sewage treatment systems of small to medium size, especially those designed for special purposes, as for pig and cattle fattening farms, etc. With that size of system, the heat developed by the biological metabolic activity is not sufficient to ensure the minimum limit of +10° C., especially in the cooler seasons of the year. And as the biological section is further ventilated with air, oxygen or the like, yet further heat is withdrawn from it, even when the air or the oxygen has a temperature of +20° C. Moreover, the radiation surfaces for heat are relatively very large in a small system, as compared with large systems, and this fact again adversely affects the heat balance.

Now, it was found that the biological metabolic activity can be appreciably intensified by maintaining an optimal temperature for the particular bacterial culture existing or to be built up in the biological section of a sewage treatment system.

The obvious answer would therefore be to heat the biological section in order to prevent any undesirable drop in the temperature, but this is usually impracticable for economic reasons, so that it is necessary instead to make the biological section so large as to ensure adequate efficiency even at temperatures reducing the bacterial activity. However, this over-dimensioning of the system involves higher investment and running costs.

The object of the present invention is to maintain the temperature in a biological breakdown system at a level favorable for bacterial activity and at acceptable cost.

The method claimed hereunder is characterized in that hot gas and/or hot steam is supplied to the breakdown system for the purpose of keeping the temperature there at a level ideal for the bacterial cultures.

It will be possible in many cases by such temperature control to improve the efficiency of a biological purification system to such a degree that the system can be made considerably smaller than it would be in ordinary circumstances.

The invention is now to be described by way of example with reference to the accompanying drawing. The drawing shows a diagram of a biological breakdown system for the continuous treatment of agricultural sewage.

The sewage to be treated, in the form of flushing water mixed with excrement, urine, feed, waste, household and silo waste water and the like, is gathered in a catch pit 1, preferably so dimensioned that it can hold at least the quantity of such sewage accumulating in 24 hours. Where the cattle sheds, etc. are littered and there is also household waste to be treated, it is advisable to arrange a distintegrator (not shown) ahead of the said catch pit.

An agitator 2 prevents any settling of the heavy solids in the catch pit.

A volumetric pump 3 draws the sewage from the catch pit 1 and pumps it to a filtering machine 4. The filtering machine 4 filters out all solids in suspension up to a minimum grain size of 50 microns, for instance. Vibrating or joggling sieves have proved best suited for this first mechanical separation stage.

The moisture content of the solids thus separated ranges from 75 to 85%.

The solids, still wet, are either dumped on a compost heap, possibly by belt conveyor, or, as shown in the drawing, are forwarded to a thermal drier 18 and thence, as by a fan 23, to a separation cyclone 19. Experience has shown that the solids having a moisture content of 75–85% can be readily composted on a compost heap or dried in suitable thermal driers to a residual moisture of 8–15% at relatively little cost. The water quantities evaporating in this case are only a fraction of those evaporating in a full-scale drying process and are therefore acceptable economically.

Such thermal drying ensures an almost unlimited storage life of the valuable fertilizing substances and so considerably reduces the cost of transporting them to a dry fertilizer factory for the purpose of mixing with other natural fertilizers or with artificial fertilizers.

Where the liquid phase extracted from the filtering machine 4, as by a pump 7, is to undergo further treatment, chemicals are successively added to it in the reaction stage 5 by means of dosing pumps 17 in a continuous process, in order to regulate the pH value of the liquid phase and at the same time to flocculate and precipitate the suspended colloidal and dissolved substances organically charging the sewage. Instead, however, it is possible to carry out the pH regulation, if at all necessary, before or in the first flotation tank 6, or before or in the filtering machine 4. This precipitation of the suspended fines still present after the preliminary treatment and of the colloidal and dissolved substances is according to experience best effected in the acid or neutral range, i.e. at a pH value of 4.5 to 7.0, in conjunction with suitable flocculants and precipitants.

Suitable flocculants are particularly high-polymerized compounds such as homopolymerized and/or copolymerized polyacrylic acids as ionogenic polyelectrolytes and non-ionogenic anionic and cationic polymers. This group includes polyacrylates, polymethacrylates, polyacrylamides, polyethylene oxides, polyamines and mixed polymerisates of vinyl acetate or styrene with maleic acid anhydride, for instance. Suitable precipitants are salts of multivalent metals, whose effect can be surprisingly greatly increased by suitable control of the pH value of the mechanically pre-treated sewage. The best results were obtained with pH regulation in conjunction with precipitation with a salt/acid mixture, in particular aluminum sulphate and sulphuric acid. In the present case, precipitation in the neutral or acid range was unlikely to be successful, because in that medium the proteins show increasing contraction properties with falling pH value, and this effect reaches its maximum at the isoelectric point of the proteins. Addition of a salt/acid mixture, in particular aluminum sulphate and sulphuric acid, as precipitating and pH-regulating mixture, completely overrides the slight alkalinity of the aluminum sulphate and considerably increases the adsorption and bridge-forming capacity between two particles. This also assists the action of the flocculant, in particular of ionogenic polyelectrolytes.

The supply solutions of those products are periodically made up and stirred in tanks 15 by agitators 16, as once a week, for instance.

The precipitation of the suspended colloidal and dissolved substances results in a clearly visible formation of flocculi, which are separated in a flotation tank 6. The flotation of the flocculi is greatly helped by ventilation or the generation of an electric field. This process results in a clear filtrate whose $BSB_5$ charge is about 1,000 mg./liter. It has a slight yellow-brown color and still retains a certain odor.

In many cases, the sewage thus treated is either passed on to a conventional sewage treatment plant or left exposed to the rain. It must be remembered here that conventional systems have a biological section 20. Normally, however, the treatment is carried further in a special biological system directly in the system described for the purpose of passing the treated sewage to a main canal as specified by the regulations issued by the Swiss Federal Department of the Interior, Sept. 1, 1966. In a preferred version, the biological section 20 can be divided into a ventilation tank and a settling tank.

The periodically and continuously separated flocculi can be fed back to the filtering machine 4 or conveyed directly to the drier 18.

The mixture of hot air and steam coming from the drier 18 is forwarded by the fan 23 through the separating cyclone 19 to the biological section 20, where it is cooled, together with condensation of the steam contained in it.

At the same time, any dust not separated in the cyclone 19 is washed out in the biological section 20. Owing to the injection of the mixture of hot air and steam and the condensation of the steam, heat, exchanged by contact, is transferred to the mixture of water and sludge present in the biological section and heats the mixture accordingly, as to 30° C., for instance, in order to optimize the bacterial growth. An additional effect consists in the deodorization of the mixture of hot air and steam, so that the cooled and noncondensed gases leaving the biological section are practically odorless. In a preferred version, the temperature in the biological section 20, assisted by the temperature of the mixture of hot air and steam injected, can be kept at a constant level by a thermostat, not shown in the drawing, as at 30° C. for instance.

A hydraulic charge of the biological system due to condensed steam is not likely so long as the quantity of the steam is in an acceptable proportion to the volume of the system. In fact, a certain water loss through surface evaporation is likely.

The injection of the mixture of hot air and steam into the biological system can be effected in various ways. A simple method consists in admixing the said mixture to the intake air of the blowers used to inject air or $O_2$ into the biological section.

Where the mixture of hot air and steam cannot be injected by a blower, because the injection nozzles might get clogged, for instance, the mixture can be introduced into the biological section separately, as by an injector 22. For this purpose, it is not necessary to use fresh water as the propelling liquid; instead, it is possible, with the aid of another pump 8, for instance, to use the sewage passed for treatment into the biological section 20.

It is advisable to collect the clear liquid in a catch tank 14, so that its quality can be continually checked and at least part of it can be re-used to clean the cattle sheds, by means of a pump 24. The overflow of the catch tank 14 is passed to the main canal.

To increase the biological metabolic activity, the biological section of the system can be inoculated before or during the running-in period in a directed manner with cultures of micro-organisms, in particular such as develop a higher metabolic activity at a low temperature level and can also deliver more quickly at any temperature level the minimum bacterial count required for normal or increased metabolic activity.

The micro-organisms required for the purpose can be assembled in specific pure and/or mixed cultures in such a manner as to be particularly suitable for the substances to be biologically broken down in the sewage.

To ensure optimal conditions in the biological section of the system, it is not only necessary to maintain optimal temperature conditions for the growth of the microbiological cultures, but also to ensure periodically repeated or even continuous inoculation with fresh stocks of micro-organisms. It is thus possible to reduce the running-in period of a system from months to days, or even to hours, which presents a substantial advantage in terms of efficiency and cost. Where sewage gases, in particular methane gases, occur and have to be collected, as in digesting tanks, they can be used instead to heat the biological section.

The method described can be quite generally applied for biological breakdown systems such as are strongly indicated for the biological conversion of animal waste products, for instance.

What is claimed is:

1. In a method for the purification of sewage in a relatively small apparatus comprising: gathering the sewage; separating said sewage into two components, one of which comprises large solid particles and the other of which comprises predominantly liquid and small particles; drying said large particles with hot vapor; treating said predominantly liquid phase to effect flocculation and precipitation of suspended particles and provision of a clear liquid; and effecting aerobic biological purification of said clear liquid, the improvement comprising:

passing the hot vapor obtained downstream from the drying of said large particles into said clear liquid undergoing aerobic purification and raising the temperature of said clear liquid to about 20–50° C. to increase the rate of said aerobic purification.

2. A method in accordance with claim 1 wherein said hot vapor is selected from the group consisting of steam, hot air and mixtures thereof and said temperature of the clear liquid is maintained at 20 to 37° C.

3. Method according to claim 1, characterized in that the said hot vapor is introduced by an injector, and that the clear liquid to be treated in the biological system is used as the propelling medium.

4. Method according to claim 3, characterized in that the hot vapor is further deodorized and dedusted during said aerobic purification.

5. Method according to claim 1, characterized in that the aerobic purification system is heated before or during its running-in period or inoculated at least once with bred cultures for the purpose of reducing the running-in period.

6. Method according to claim 1, characterized in that the aerobic purification system is inoculated with cultures during operation.

7. Method according to claim 1, characterized in that the heating is at least partly fueled with sewage gases from digesting tanks.

8. In a relatively small apparatus for the purification of sewage comprising: means to collect the sewage; means to separate the so collected sewage into two components, one of which comprises large solid particles and the other of which comprises predominantly liquid and small particles; means for drying said large particles with hot vapor; means for treating said predominantly liquid phase to effect flocculation and precipitation of suspended particles and provision of a clear liquid; and means for effecting aerobic biological purification of said clear liquid, the improvement comprising:

means for passing hot vapor to said means to effect aerobic biological purification and for raising the temperature of said clear liquid to about 20–50° C. to increase the rate of said aerobic purification, said hot vapor passing means being connected to said means for drying large particles to receive the hot vapor from said large particle drying means.

9. Apparatus in accordance with claim 8 further comprising means for measuring the temperature in said means to effect aerobic biological purification, and means to regulate said temperature.

10. Apparatus in accordance with claim 8 further comprising means for admixing fresh air with said hot vapor passed into said means to effect aerobic biological purification.

References Cited

UNITED STATES PATENTS

| | | | |
|---|---|---|---|
| 3,607,737 | 9/1971 | Gamer | 210—12 |
| 2,062,025 | 11/1936 | Harrington | 210—15 X |
| 3,219,575 | 11/1965 | Chapman et al. | 210—12 X |
| 2,638,444 | 5/1953 | Kappe | 210—12 X |

FOREIGN PATENTS

| | | | |
|---|---|---|---|
| 1,105,356 | 4/1961 | Germany | 210—12 |

OTHER REFERENCES

Greene, R. A., Sludge Heating Methods, Sewage Works Journal, vol. 21, November 1949, pp. 968–973, 210-12.

MICHAEL ROGERS, Primary Examiner

U.S. Cl. X.R.

210—10, 12, 18, 149, 180, 195